(12) United States Patent
Kisen et al.

(10) Patent No.: US 9,683,190 B2
(45) Date of Patent: Jun. 20, 2017

(54) LUBRICANT FOR COMPRESSION TYPE REFRIGERATING MACHINES

(71) Applicant: IDEMITSU KOSAN CO., LTD., Chiyoda-ku (JP)

(72) Inventors: Tadashi Kisen, Ichihara (JP); Tomoya Matsumoto, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/430,704

(22) PCT Filed: Sep. 27, 2013

(86) PCT No.: PCT/JP2013/076410
§ 371 (c)(1),
(2) Date: Mar. 24, 2015

(87) PCT Pub. No.: WO2014/051108
PCT Pub. Date: Apr. 3, 2014

(65) Prior Publication Data
US 2015/0275119 A1    Oct. 1, 2015

(30) Foreign Application Priority Data

Sep. 28, 2012   (JP) .................................. 2012-218003
Sep. 28, 2012   (JP) .................................. 2012-218007

(51) Int. Cl.
C09K 5/04       (2006.01)
C10M 107/32     (2006.01)
C10M 171/00     (2006.01)

(52) U.S. Cl.
CPC ............ *C10M 107/32* (2013.01); *C09K 5/045* (2013.01); *C10M 171/008* (2013.01); *C09K 2205/122* (2013.01); *C09K 2205/24* (2013.01); *C10M 2209/04* (2013.01); *C10M 2209/043* (2013.01); *C10M 2209/1033* (2013.01); *C10M 2209/1045* (2013.01); *C10M 2209/1055* (2013.01); *C10N 2220/021* (2013.01); *C10N 2220/302* (2013.01); *C10N 2230/02* (2013.01); *C10N 2230/06* (2013.01); *C10N 2240/30* (2013.01)

(58) Field of Classification Search
CPC .......... C10M 107/22; C10M 2209/043; C10M 2209/1033
See application file for complete search history.

(56) References Cited

U.S. PATENT DOCUMENTS

| 5,518,643 A * | 5/1996 | Egawa .................... C07C 41/28 |
| | | 252/67 |
| 6,261,474 B1* | 7/2001 | Egawa ................. C10M 107/24 |
| | | 252/67 |
| 6,454,960 B1* | 9/2002 | Sunaga .................. C09K 5/045 |
| | | 252/67 |
| 2004/0157753 A1* | 8/2004 | Tazaki ................... C09K 5/045 |
| | | 508/462 |
| 2007/0164252 A1* | 7/2007 | Tokiai .................... C09K 5/042 |
| | | 252/68 |
| 2010/0139311 A1* | 6/2010 | Nagao .................. C10M 107/34 |
| | | 62/468 |
| 2010/0281912 A1 | 11/2010 | Kaneko et al. |
| 2011/0000253 A1 | 1/2011 | Sato et al. |
| 2012/0132848 A1* | 5/2012 | Sawada .................. C09K 5/045 |
| | | 252/68 |

FOREIGN PATENT DOCUMENTS

| CN | 101965392 A | 2/2011 |
| CN | 101970624 A | 2/2011 |
| EP | 0 882 779 A1 | 12/1998 |
| EP | 1 734 101 A1 | 12/2006 |
| EP | 2 119 760 A1 | 11/2009 |
| JP | 6-128578 A | 5/1994 |
| JP | 8-193196 A | 7/1996 |
| JP | 9-272886 A | 10/1997 |
| JP | 10-147682 A | 6/1998 |
| JP | 10-265790 A | 10/1998 |
| JP | 11-323369 A | 11/1999 |
| JP | 2010-65190 A | 3/2010 |
| WO | WO 2007/029746 A1 | 3/2007 |
| WO | WO 2008/108365 A1 | 9/2008 |
| WO | WO 2009/066727 A1 | 5/2009 |
| WO | WO 2009/110584 A1 | 9/2009 |
| WO | WO 2012/086518 A1 | 6/2012 |

OTHER PUBLICATIONS

Combined Chinese Office Action and Search Report issued Apr. 15, 2016 in Patent Application No. 201380050447.3 (with English translation of Categories of Cited Documents).
Extended European Search Report issued Apr. 21, 2016 in Patent Application No. 13840751.5.
International Search Report issued Dec. 17, 2013 in PCT/JP2013/076410 Filed Sep. 27, 2013.
Office Action issued Oct. 18, 2016 in Japanese Patent Application No. 2014-538653.

* cited by examiner

*Primary Examiner* — John Hardee
(74) *Attorney, Agent, or Firm* — Oblon, McClelland, Maier & Neustadt, L.L.P.

(57) ABSTRACT

The present invention is a lubricating oil for compression-type refrigerators using a difluoromethane (R32) refrigerant. The lubricating oil for compression-type refrigerators contains a first polyvinyl ether compound that is a polymer having a structural unit of a specific structure and has a carbon/oxygen molar ratio of from 3.0 to less than 4.0.

11 Claims, No Drawings

LUBRICANT FOR COMPRESSION TYPE REFRIGERATING MACHINES

TECHNICAL FIELD

The present invention relates to a lubricating oil for compression-type refrigerators and, more specifically, to a lubricating oil for compression-type refrigerators using a difluoromethane (R32) refrigerant and a method for producing it, to a composition for compression-type refrigerators, as well as to a compression-type refrigeration apparatus using it.

BACKGROUND ART

Heretofore, in a refrigerator, for example, a compression-type refrigeration cycle comprising a compressor, a condenser, an expansion valve and an evaporator, HFCs (hydrofluorocarbons), for example, 1,1,1,2-tetrafluoroethane (R134a) as well as other various types of so-called alternatives for chlorofluorocarbons that are free from environmental pollution have been used as refrigerants. However, such HFCs also involve some problems in that their risk of global warming is high, and recently, use of refrigerants free from such problems has become taken into consideration.

As refrigerants having few influences on global warming, R32 (difluoromethane) refrigerant has also been taken into consideration as an alternative refrigerant, in addition to carbonic acid gas (carbon dioxide), ammonia, hydrocarbon gas.

For example, carbonic acid gas (carbon dioxide) is harmless to the environments, but has problems in that the pressure thereof is high as compared with that of HFC, etc. Use of ammonia and hydrocarbons is not still popular from the viewpoint of toxicity and flammability thereof.

On the other hand, R32 refrigerant is excellent in point of the performance thereof as a refrigerant in that the global warming coefficient of R32 refrigerant is lower than that of HFC refrigerant and therefore, its applicability as a next-generation refrigerant is now under investigation.

A compression-type refrigerator generally comprises at least a compressor, a condenser, an expansion mechanism (such as an expansion valve) and an evaporator, and is constructed in such that a mixed liquid composed of a refrigerator oil that is a lubricant oil for refrigeration apparatuses and a refrigerant is circulated through a closed system including these devices. In such a compression-type refrigerator, in general, a high temperature is established in a compressor while a low temperature is established in a cooler, though depending upon the devices used. Therefore, it is necessary that the refrigerant and the lubricating oil can be circulated through the system without causing a phase separation in a wide temperature range encompassing from the low temperature to the high temperature.

In general, the temperature range in which a refrigerant and a lubricating oil are kept dissolved with no phase separation is preferably from lower than −20° C. to 0° C. or higher. Phase separation, if occurring during refrigerator operation, would have significant negative influences on the life and the efficiency of the apparatus. For example, if phase separation between a refrigerant and a lubricating oil occurs in a compressor section, lubricity in a moving part will become insufficient so that seizing and other problems will occur to considerably reduce the service life of the apparatus. On the other hand, if phase separation occurs in an evaporator, the heat exchange efficiency is reduced because of the presence of a highly viscous lubricating oil. In addition, a lubricating oil for compression-type refrigerators is used for the purpose of lubricating the moving part of a refrigerator, and therefore the lubricating performance thereof is naturally important.

Accordingly, development of a novel refrigerator oil is being advanced suitable for use along with R32 refrigerant, and polyvinyl ether (PVE) is considered as one candidate for it.

However, in case where R32 refrigerant is used in low-temperature devices and when heretofore known PVE is used as a lubricating oil therein, the miscibility of the two is insufficient. Consequently, in case where R32 refrigerant is used in low-temperature devices, the lubricating oil to be used therein is desired to be miscible with the refrigerant with no separation even at a temperature lower than −20° C., and various investigations have heretofore been made.

For example, a lubricating oil for refrigerators using a polyvinyl ether compound having a carbon/oxygen molar ratio (C/O molar ratio) of from 4.2 to 7.0 is disclosed (for example, see PTL 1). The reference describes the miscibility of the compound with R32 refrigerant, but the two-phase separation temperature on the low temperature side of the compound is high, and therefore the miscibility of the two is not always sufficient for use in low-temperature devices.

Use of a polyvinyl ether compound with an oxyalkylene structure introduced into the side chain thereof as a lubricating oil for refrigerators has been investigated (for example, see PTL 2). The reference discloses miscibility of the compound with R32 refrigerant, but the miscibility of the two is not necessarily sufficient.

Further, use of a polyvinyl ether copolymer copolymerized with a structural unit having different ether structures in the side chains thereof, as a lubricating oil for refrigerators has also been investigated (for example, see PTL 3). Also in this case, however, the miscibility between the polyvinyl ether compound and R32 refrigerant is not necessarily sufficient.

On the other hand, a lubricating oil for refrigerators, comprising a compound having a polyalkylene glycol unit and a polyvinyl ether unit in the molecule is disclosed (for example, see PTLs 4 and 5), but this is a lubricating oil for $CO_2$ refrigerant, and no miscibility data thereof with R32 refrigerant are disclosed in the references.

PTL 5 discloses a technique that a polyvinyl ether compound having a C/O molar ratio of 4.0 or less has an excellent miscibility with natural refrigerants ($CO_2$, $NH_3$, $C_3H_8$), but refers to nothing relating to R32 refrigerant.

As in the above, the lubricant oils heretofore disclosed all have a problem of separation from R32 refrigerant at up to −20° C.

CITATION LIST

Patent Literature

PTL 1: JP 8-193196 A
PTL 2: JP 6-128578 A
PTL 3: JP 9-272886 A
PTL 4: WO2008/108365
PTL 5: WO2007/029746

SUMMARY OF INVENTION

Technical Problem

The present invention has been made in view of the above-described circumstance and has as its object the provision of a lubricating oil for compression-type refrigerators not separating from R32 refrigerant even at a temperature lower than −20° C. and of a method for producing it, as well as the provision of a composition for compression-type refrigerators using the lubricating oil for compression-type refrigerators, etc.

Solution to Problem

The first aspect of the present invention is (1) a lubricating oil for compression-type refrigerators using a difluoromethane (R32) refrigerant, which contains a first polyvinyl ether compound that is a polymer having a structural unit represented by a general formula (I-1) and has a carbon/oxygen molar ratio of from 3.0 to less than 4.0.

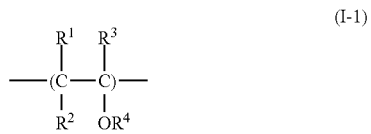

In the formula, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms. $R^1$ to $R^4$ may be the same or different in each structural unit.

Preferably, in the first aspect of the present invention, (2) the polyvinyl ether compound contains a methoxy group in a ratio of 1 mol % or more relative to all the side chains in the polymer.

The second aspect of the present invention is a lubricating oil for compression-type refrigerators using a difluoromethane (R32) refrigerant, which contains a second polyvinyl ether compound that is a polymer having an alkylene glycol unit or a polyoxyalkylene glycol unit and a vinyl ether unit in the molecule and having a molecular weight falling within a range of from 300 to 3,000, and in which the carbon/oxygen molar ratio in all the side chains in the polymer is from 1.00 to less than 2.40.

Preferably, in the second aspect of the present invention, (4) the second polyvinyl ether compound has a structure represented by a general formula (I-2).

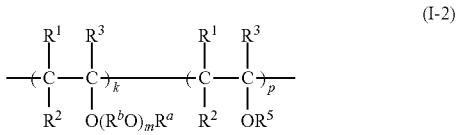

In the formula, $R^1$, $R^2$ and $R^3$ each represent a hydrogen atom or a hydrocarbon group having from 1 to 8 carbon atoms, and these may be the same or different. $R^b$ represents a divalent hydrocarbon group having from 2 to 4 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^5$ represents a hydrocarbon group having from 1 to 10 carbon atoms. In case where the formula has plural $R^a$'s, $R^b$'s and $R^5$'s, they may be individually the same or different.

m indicates from 1 to 50 as an average value, k indicates from 1 to 50, p indicates from 0 to 50, and when k and p are plural numbers, they may indicate block units or random units. When the formula has plural $R^bO$'s, those plural $R^bO$'s may be the same or different.

Also preferably, in the second aspect of the present invention, (5) the second polyvinyl ether compound contains an ethylene glycol residue and/or a propylene glycol residue in the polymer; and preferably, (6) the second polyvinyl ether compound contains an ethylene glycol residue and/or a propylene glycol residue in a ratio of from 5% by mass to 50% by mass relative to the entire mass of the compound.

The lubricating oil for compression-type refrigerators of the first aspect of the present invention can be produced according to a production method for a lubricating oil for compression-type refrigerators described below. Specifically, the production method is (7) a method for producing a lubricating oil for compression-type refrigerators, comprising polymerizing a vinyl ether monomer represented by a general formula (II-1), using one or more types of first polymerization initiators selected from methanol, dimethyl acetal and ethylmethyl acetal, thereby producing the lubricating oil for compression-type refrigerators described in (1) or (2).

In the formula, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms.

The lubricating oil for compression-type refrigerators of the second aspect of the present invention can be produced according to a production method for a lubricating oil for compression-type refrigerators described below.

Specifically, the production method is (8) a method for producing a lubricating oil for compression-type refrigerators, comprising polymerizing a vinyl ether monomer represented by a general formula (II-2), using a second polymerization initiator that is an alkylene glycol compound or a polyoxyalkylene glycol compound represented by a general formula (III), thereby producing the lubricating oil for compression-type refrigerators described in any of (3) to (6).

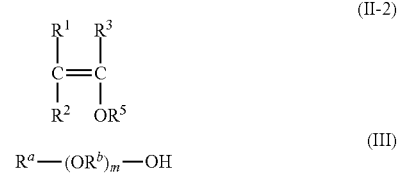

In the formula, $R^1$, $R^2$ and $R^3$ each represent a hydrogen atom or a hydrocarbon group having from 1 to 8 carbon atoms, and these may be the same or different. $R^5$ represents a hydrocarbon group having from 1 to 10 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^b$ represents a divalent hydrocarbon group having from 2 to 4 carbon atoms. m indicates a number of from 1 to 50 as an average value.

The lubricating oil for compression-type refrigerators of the first aspect of the present invention and the lubricating oil for compression-type refrigerators of the second aspect of the present invention may constitute a composition for compression-type refrigerators along with R32 refrigerant.

Specifically, the composition for compression-type refrigerators of the present invention is (9) a composition for compression-type refrigerators, containing the lubricating oil for compression-type refrigerators described in any of (1) to (6), and R32 refrigerant.

The composition for compression-type refrigerators may be (10) a composition for compression-type refrigerators, containing the lubricating oil for compression-type refrigerators obtained according to the production method described in (7) or (8), and R32 refrigerant.

Using the lubricating oil for compression-type refrigerators of the first aspect of the present invention and the lubricating oil for compression-type refrigerators of the second aspect of the present invention, a compression-type refrigeration apparatus may be constructed. Specifically, the compression-type refrigeration apparatus of the present invention is (11) a compression-type refrigeration apparatus using the lubricating oil for compression-type refrigerators described in any of (1) to (6) and/or the lubricating oil for compression-type refrigerators obtained according to the production method described in (7) or (8).

Advantageous Effects of Invention

According to the present invention, there are provided a lubricating oil for compression-type refrigerators not separating from R32 refrigerant even at a temperature lower than −20° C. and its production method, as well as a composition for compression-type refrigerators using the lubricating oil for compression-type refrigerators, etc. As a result, the present invention makes it possible to use R32 refrigerant having a low global warming coefficient and contributes toward prevention of global warming.

DESCRIPTION OF EMBODIMENTS

First described is the lubricating oil for compression-type refrigerators of the present invention.
[Lubricating Oil for Compression-Type Refrigerators and Production Method Thereof]

The lubricating oil for compression-type refrigerators of the present invention includes a lubricating oil for compression-type refrigerators of the first aspect of the present invention and a lubricating oil for compression-type refrigerators of the second aspect of the present invention, as described below.

The lubricating oil for compression-type refrigerators of the first aspect of the present invention is a lubricating oil for compression-type refrigerators using a difluoromethane (R32) refrigerant, which contains a first polyvinyl ether compound that is a polymer having a structural unit represented by a general formula (I-1) and has a carbon/oxygen molar ratio of from 3.0 to less than 4.0.

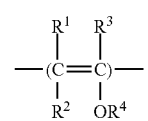

In the formula, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms. $R^1$ to $R^4$ may be the same or different in each structural unit.

Having the above-mentioned constitution, the lubricating oil for compression-type refrigerators of the first aspect of the present invention can be a lubricating oil for compression-type refrigerators that does not separate from R32 refrigerant even at a temperature lower than −20° C.

The lubricating oil for compression-type refrigerators of the second aspect of the present invention is a lubricating oil for compression-type refrigerators using a difluoromethane (R32) refrigerant, which contains a second polyvinyl ether compound that is a polymer having an alkylene glycol unit or a polyoxyalkylene glycol unit and a vinyl ether unit in the molecule and having a molecular weight falling within a range of from 300 to 3,000, and in which the carbon/oxygen molar ratio in all the side chains in the polymer is from 1.00 to less than 2.40.

Having the above-mentioned constitution, the lubricating oil for compression-type refrigerators of the second aspect of the present invention can be a lubricating oil for compression-type refrigerators that does not separate from R32 refrigerant even at a temperature lower than −20° C. and, in addition, has a high viscosity index.

Specifically, the lubricating oil for compression-type refrigerators of the first aspect of the present invention and the lubricating oil for compression-type refrigerators of the second aspect of the present invention are both lubricating oils for compression-type refrigerators using a difluoromethane (R32) refrigerant, and these contain, as a base oil, a polyvinyl ether compound having a specific structure and a specific carbon/oxygen molar ratio.

The polyvinyl ether compound for use in the lubricating oil for compression-type refrigerators is described in detail hereinunder.
(Polyvinyl Ether Compound)
1. First Polyvinyl Ether Compound In the lubricating oil for compression-type refrigerators of the first aspect of the present invention, the first polyvinyl compound used as a base oil is a polymer having a structural unit represented by the above-mentioned general formula (I-1).

From the viewpoint of the miscibility of the lubricating oil for compression-type refrigerators and R32, the carbon/oxygen molar ratio in the first polyvinyl ether compound is from 3.0 to less than 4.0. When the carbon/oxygen molar ratio is 4.0 or more, then the lubricating oil separates from R32 refrigerant at a temperature lower than −20° C. When the carbon/oxygen molar ratio is less than 3.0, then the viscosity index and the volume resistivity of the oil are unfavorably small except in the case where the constitution of the polyvinyl ether compound is the constitution of the second polyvinyl ether compound.

The carbon/oxygen molar ratio in the first polyvinyl ether compound is preferably from 3.5 to 3.9, more preferably from 3.7 to 3.9.

The carbon/oxygen molar ratio in the first polyvinyl ether compound can be determined through elementary analysis of the first polyvinyl ether compound followed by calculation of the measured results.

As described above, the first polyvinyl ether compound is a polymer having a structural unit represented by the general formula (I-1), and $R^1$ to $R^3$ and $OR^4$ in the general formula (I-1) constitute the side chains of the polymer.

In the lubricating oil for compression-type refrigerators of the first aspect of the present invention, preferably, the first polyvinyl ether compound contains a methoxy group in a ratio of 1 mol % or more relative to the molar amount of all the side chains in the polymer, from the viewpoint of the miscibility between the lubricating oil for compression-type refrigerators and R32 refrigerant.

Further, more preferably, the first polyvinyl ether compound contains a methoxy group in a ratio of 5 mol % or more.

In the formula (I-1), $R^1$, $R^2$ and $R^3$ each represent a hydrogen atom or a hydrocarbon group having from 1 to 8 carbon atoms, and these may be the same or different.

Here, concretely, the hydrocarbon group having from 1 to 8 carbon atoms includes, for example, alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; cycloalkyl groups such as a cyclopentyl group, a cyclohexyl group, various methylcyclohexyl groups, various ethylcyclohexyl groups, various dimethylcyclohexyl groups, etc.; aryl groups such as a phenyl group, various methylphenyl groups, various ethylphenyl groups, various dimethylphenyl groups, etc.; arylalkyl groups such as a benzyl group, various phenylethyl groups, various methylbenzyl groups, etc.

Of the above, $R^1$, $R^2$ and $R^3$ in the general formula (I-1) are especially preferably hydrogen atoms.

Further, $R^4$ in the general formula (I-1) represents a hydrocarbon group having from 1 to 20 carbon atoms.

Concretely, the hydrocarbon group having from 1 to 20 carbon atoms includes, for example, alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, etc.; cycloalkyl groups such as a cyclopentyl group, a cyclohexyl group, various methylcyclohexyl groups, various ethylcyclohexyl groups, various propylcyclohexyl groups, various dimethylcyclohexyl groups, etc.; aryl groups such as a phenyl group, various methylphenyl groups, various ethylphenyl groups, various dimethylphenyl groups, various propylphenyl groups, various trimethylphenyl groups, various butylphenyl groups various naphthyl groups, etc.; arylalkyl groups such as a benzyl group, various phenylethyl groups, various methylbenzyl groups, various phenylpropyl groups, various phenylbutyl groups, etc.

$R^1$ to $R^4$ in the general formula (I-1) may be the same or different in each structural unit. Specifically, the polyvinyl ether compound constituting the lubricating oil of the present invention may be a copolymer in which any or all of $R^1$ to $R^4$ differ in each structural unit.

The degree of polymerization of the first polyvinyl ether compound having the structural unit represented by the above-mentioned general formula (I-1) may be suitably selected in accordance with the desired kinematic viscosity. In general, the degree of polymerization of the first polyvinyl ether compound is so selected that the kinematic viscosity of the first polyvinyl ether compound at 40° C. is preferably from 5 to 1,000 mm²/s, more preferably from 7 to 300 mm²/s, even more preferably from 10 to 150 mm²/s.

The first polyvinyl ether compound having the above-mentioned properties can be produced as mentioned below. Specifically, using one or more types of first polymerization initiators selected from methanol, dimethylacetal and ethylmethylacetal, a vinyl ether monomer represented by a general formula (II-1) is polymerized according to a heretofore-known method to give a polymer, thereby producing the first polyvinyl ether compound. The resultant polymer may be further hydrogenated.

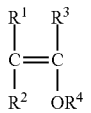

(II-1)

In the formula, $R^1$, $R^2$, $R^3$ and $R^4$ are the same as $R^1$, $R^2$, $R^3$ and $R^4$ in the general formula (I-1). Specifically, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms. $R^1$ to $R^4$ may be the same or different in each structural unit.

The vinyl ether monomer represented by the general formula (II-1) includes, for example, vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, etc.

The first polyvinyl ether compound can be produced through radical polymerization, cationic polymerization, radiation polymerization or the like of the vinyl ether monomer represented by the general formula (II-1). For example, a polymer having a desired viscosity can be produced by polymerizing a vinyl ether monomer represented by the general formula (II-1) according to the method mentioned below. In polymerization initiation, at least one or more types of first polymerization initiators selected from methanol, dimethyl acetal and ethylmethyl acetal are used. For polymerization of the vinyl ether monomer represented by the general formula (II-1), further the following components may be used, if desired. For example, a combination of a Broensted acid, a Lewis acid or an organometallic compound with water, an alcohol, a phenol, an acetal or an addition product of a vinyl ether and a carboxylic acid can be used. As the Broensted acid, there may be mentioned, for example, hydrofluoric acid, hydrochloric acid, hydrobromic acid, hydroiodic acid, nitric acid, sulfuric acid, trichloroacetic acid, trifluoroacetic acid, etc. As the Lewis acid, there may be mentioned, for example, boron trifluoride, aluminum trichloride, aluminum tribromide, tin tetrachloride, zinc dichloride, ferric chloride, etc. Among these Lewis acids, boron trifluoride is particularly preferred. As the organometallic compound, there may be mentioned, for example, diethyl aluminum chloride, ethyl aluminum chloride, diethyl zinc, etc.

Any of water, an alcohol, a phenol, an acetal or an addition product of a vinyl ether and a carboxylic acid may be arbitrarily selected for combining with those mentioned above. Here, the alcohol includes those mentioned above, for example, saturated aliphatic alcohols having from 1 to 20 carbon atoms, such as methanol, ethanol, propanol, isopropanol, butanol, isobutanol, sec-butanol, tert-butanol, various pentanols, various hexanols, various heptanols, various octanols, etc.; unsaturated aliphatic alcohols having from 3 to 10 carbon atoms such as allyl alcohol, etc. The acetal includes dimethyl acetal, ethylmethyl acetal.

However, in the first aspect of the present invention, as described above, the polymerization initiator necessarily contains one or more selected from methanol, dimethyl acetal and ethylmethyl acetal.

The polymerization of the vinyl ether monomer represented by the general formula (II-1) can be initiated at a temperature between −80 and 150° C., and can be generally carried out within a temperature range of from −80 to 50° C., although the temperatures vary with the kinds of the starting material and the initiator. The polymerization terminates in about 10 seconds to 10 hours after the start of the reaction. With regard to the control of the molecular weight in the polymerization, a polymer having a low average molecular weight can be obtained by increasing the amount of the water, alcohol, phenol, acetal or addition product of a vinyl ether and a carboxylic acid relative to the vinyl ether monomer represented by the general formula (II-1). Further, a polymer having a low average molecular weight can be obtained by increasing the amount of the above-described Broensted acid and Lewis acid. The polymerization is generally carried out in the presence of a solvent.

The solvent is not specifically limited as long as it can dissolve the necessary amount of the reaction starting materials and is inert to the reaction. For example, favorably used here are a hydrocarbon solvent such as hexane, benzene, toluene, etc., and an ether solvent such as ethyl ether, 1,2-dimethoxyethane, tetrahydrofuran, etc. The polymerization may be terminated by addition of an alkali. After the termination of the polymerization, if desired, the reaction liquid is subjected to usual separation and/or purification treatments to give the intended first polyvinyl ether compound having a structural unit represented by the general formula (I-1).

The first polyvinyl ether compound has a carbon/oxygen molar ratio of from 3.0 to less than 4.0. The polymer having a molar ratio falling within the above range can be produced by controlling the carbon/oxygen molar ratio of the starting monomer, vinyl ether monomer represented by the general formula (II-1). Specifically, when the carbon/oxygen molar ratio of the starting monomer is large, then a polymer having a large carbon/oxygen molar ratio tends to be obtained, but when the carbon/oxygen molar ratio of the starting monomer is small, then a polymer having a small carbon/oxygen molar ratio tends to be obtained.

In case where plural starting monomers differing in the carbon/oxygen molar ratio are used, and when the proportion of the starting monomer having a large carbon/oxygen molar ratio is large, then a polymer having a large carbon/oxygen molar ratio tends to be obtained, but when the proportion of the starting monomer having a small carbon/oxygen molar ratio is large, then a polymer having a small carbon/oxygen molar ratio tends to be obtained.

From this viewpoint, when the starting monomer contains the vinyl ether monomer represented by the general formula (II-1), then the first polyvinyl ether compound to be produced can have a carbon/oxygen molar ratio of from 3.0 to less than 4.0.

Depending on the combination of water, an alcohol, a phenol, an acetal or the like to be used as a polymerization initiator and a monomer, the carbon/oxygen molar ratio can also be controlled.

Specifically, when an alcohol, a phenol or the like having a larger carbon/oxygen molar ratio than that of the vinyl ether monomer represented by the general formula (II-1) is used as a polymerization initiator, then a polymer having a larger carbon/oxygen molar ratio than the carbon/oxygen molar ratio of the starting monomer can be obtained, while, on the other hand, when an alcohol or an acetal such as methanol, methoxyethanol, dimethyl acetal or the like having a small carbon/oxygen molar ratio is used, then a polymer having a smaller carbon/oxygen molar ratio than the carbon/oxygen molar ratio of the starting monomer can be obtained. From this viewpoint, when a first polymerization initiator such as methanol or the like is used as a polymerization initiator, then the first polyvinyl ether compound to be obtained can have a carbon/oxygen molar ratio of from 3.0 to less than 4.0.

In the first aspect of the present invention, at least one of the monomer component containing the vinyl ether monomer represented by the general formula (II-1) and the first initiator components makes the first polyvinyl ether compound have a carbon/oxygen molar ratio of from 3.0 to less than 4.0.

2. Second Polyvinyl Ether Compound

The second polyvinyl ether compound used as a base oil in the lubricating oil for compression-type refrigerators of the second aspect of the present invention is a polymer having an alkylene glycol unit or a polyoxyalkylene glycol unit, and a vinyl ether unit in the molecule and having a molecular weight falling within a range of from 300 to 3,000, and the carbon/oxygen molar ratio in all the side chains in the polymer is from 1.00 to less than 2.40.

Having the above-mentioned constitution, the lubricating oil for compression-type refrigerators of the second aspect of the present invention can be a lubricating oil for compression-type refrigerators that does not separate from R32 refrigerant even at a temperature lower than −20° C. and, in addition, has a high viscosity index.

When the molecular weight of the second polyvinyl ether compound is less than 300, then the lubricating oil could not exhibit lubrication performance and durability, and when the molecular weight thereof is more than 3,000, then the miscibility of the compound with R32 refrigerant lowers.

The molecular weight of the second polyvinyl ether compound is preferably from 300 to 2,000, more preferably from 300 to 900.

The second polyvinyl ether compound is a polymer having specific structural units and having a specific molecular weight, and contains at least an alkylene glycol group and an ether group in the side chains of the polymer.

When the carbon/oxygen molar ratio in all the side chains in the polymer constituting the second polyvinyl ether compound is less than 1.00 or 2.40 or more, then the constitution of the polyvinyl ether compound is unfavorable, except in the case where the constitution of the polyvinyl ether compound is the constitution of the first polyvinyl ether compound, in that the polyvinyl ether compound of the type separates from R32 refrigerant in any case at a temperature lower than −20° C.

The carbon/oxygen molar ratio in the second polyvinyl ether compound is preferably from 1.20 to less than 2.40, more preferably from 1.50 to less than 2.30.

Preferably, the second polyvinyl ether compound has a structure represented by the general formula (I-2).

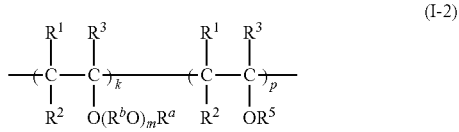
(I-2)

In the formula, $R^1$, $R^2$ and $R^3$ each represent a hydrogen atom or a hydrocarbon group having from 1 to 8 carbon atoms, and these may be the same or different. $R^b$ represents a divalent hydrocarbon group having from 2 to 4 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^5$ represents a hydrocarbon group having from 1 to 10 carbon atoms. In case where the formula has plural $R^a$'s, $R^b$'s and $R^5$'s, they may be individually the same or different.

m indicates from 1 to 50 as an average value, k indicates from 1 to 50, p indicates from 0 to 50, and when k and p are plural numbers, they may indicate block units or random units. When the formula has plural $R^bO$'s, those plural $R^bO$'s may be the same or different.

In the above-mentioned general formula (I-2), concretely, the hydrocarbon group having from 1 to 8 for $R^1$ to $R^3$ includes, for example, alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; cycloalkyl groups such as a cyclopentyl group, a cyclohexyl group, various methylcyclohexyl groups, various ethylcyclohexyl groups, various dimethylcyclohexyl groups, etc.; aryl groups such as a phenyl group, various methylphenyl groups, various ethylphenyl groups, various dimethylphenyl groups, etc.; arylalkyl groups such as a benzyl group, various phenylethyl groups, various methylbenzyl groups, etc.

Of the above, $R^1$, $R^2$ and $R^3$ in the general formula (I-2) are especially preferably hydrogen atoms.

On the other hand, the divalent hydrocarbon group having from 2 to 4 carbon atoms represented by $R^b$ concretely includes, for example, a divalent alkylene group such as a methylene group, an ethylene group, a propylene group, a trimethylene group, various butylene groups, etc.

In the general formula (I-2), m is a repeating number of $R^bO$ and is, on average, in a range of from 1 to 50, preferably from 2 to 20, more preferably from 2 to 10, especially preferably from 2 to 5.

When the formula has plural $R^bO$'s, the plural $R^bO$'s may be the same as or different from each other.

k is a number of from 1 to 50, preferably from 1 to 10, more preferably from 1 to 2, especially preferably 1. p is a number of from 0 to 50, preferably from 2 to 25, more preferably from 5 to 15. When k and p are plural numbers, they may indicate block units or random units.

The aliphatic or alicyclic hydrocarbon group having from 1 to 20 carbon atoms for $R^a$ is preferably an alkyl group having from 1 to 10 carbon atoms or a cycloalkyl group having from 5 to 10 carbon atoms, concretely including a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, various dimethylcyclohexyl groups, etc.

The aromatic group having from 1 to 20 carbon atoms and optionally having a substituent for $R^a$ concretely includes an aryl group such as a phenyl group, various tolyl groups, various ethylphenyl groups, various xylyl groups, various trimethylphenyl groups, various butylphenyl groups, various naphthyl groups, etc.; and an arylalkyl group such as a benzyl group, various phenylethyl groups, various methylbenzyl groups, various phenylpropyl groups, various phenylbutyl groups, etc.

The acyl group having from 2 to 20 carbon atoms for $R^a$ includes an acetyl group, a propionyl group, a butyryl group, an isobutyryl group, a valeryl group, an isovaleryl group, a pivaloyl group, a benzoyl group, a toluoyl group, etc.

Further, preferred examples of the oxygen-containing hydrocarbon group having from 2 to 50 carbon atoms for $R^a$ concretely include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, a (1-methyl-2-methoxy)propyl group, etc.

In the general formula (I-2), specific examples of the hydrocarbon group having from 1 to 10 carbon atoms for $R^5$ include, for example, an alkyl group such as a methyl group, an ethyl group, an n-propyl group, an isopropyl group, an n-butyl group, an isobutyl group, various pentyl groups, various hexyl groups, various heptyl groups, various octyl groups, various nonyl groups, various decyl groups, etc.; a cycloalkyl group such as a cyclopentyl group, a cyclohexyl group, various methylcyclohexyl groups, various ethylcyclohexyl groups, various propylcyclohexyl groups, various dimethylcyclohexyl groups, etc.; an aryl group such as a phenyl group, various methylphenyl groups, various ethylphenyl groups, various dimethylphenyl groups, various propylphenyl groups, various trimethylphenyl groups, various butylphenyl groups, various naphthyl groups, etc.; an arylalkyl group such as a benzyl group, various phenylethyl groups, various methylbenzyl groups, various phenylpropyl groups, various phenylbutyl groups, etc.

$R^1$ to $R^3$, $R^a$, $R^b$ and m, as well as $R^1$ to $R^3$ and $R^5$ each may be the same or different in each structural unit.

From the viewpoint of the miscibility thereof with R32 refrigerant, the second polyvinyl ether compound has an alkylene glycol unit or a polyoxyalkylene glycol unit in the molecule. Here, the alkylene glycol unit means, with reference to the polyvinyl ether compound represented by the general formula (I-2), a structural unit of the alkylene glycol unit including "$R^1$" to "$R^3$" and "—O($R^bO$)m$R^a$" in the general formula (I-2) where m is 1. Similarly, the polyoxyalkylene glycol unit means the structural unit in the general formula (I-2) where m is more than 1.

Accordingly, the second polyvinyl ether compound has an alkylene glycol residue represented by "—O($R^bO$)m$R^a$".

Here, in case where $R^b$ is an ethylene group having 2 carbon atoms, "—O($R^bO$)m$R^a$" is an ethylene glycol residue, and where $R^b$ is a propylene group having 3 carbon atoms, "—O($R^bO$)m$R^a$" is a propylene glycol residue.

Preferably, the second polyvinyl ether compound contains an ethylene glycol residue and/or a propylene glycol residue in the structural unit. Especially preferably, the second polyvinyl ether compound contains an ethylene glycol residue and/or a propylene glycol residue in a ratio of from 5% by mass to 50% by mass relative to the entire mass of the second polyvinyl ether compound, more preferably in a ratio of from 10% by mass to 40% by mass.

When the second polyvinyl ether compound contains an ethylene glycol residue and/or a propylene glycol residue in a ratio of from 5% by mass to 50% by mass relative to the entire mass of the second polyvinyl ether compound, then the miscibility of the compound with R32 refrigerant at a temperature lower than −20° C. improves further more.

In the present invention, "ethylene glycol residue" and "propylene glycol residue" include not only low-molecular residues such as an ethylene glycol residue and a propylene glycol residue, of "—O($R^b$O)mR$^a$" where m is 1, a triethylene glycol residue where m is 3, etc., but also high-molecular residues of a polyethylene glycol residue and a polypropylene glycol residue.

The degree of polymerization of the second polyvinyl ether compound may be suitably selected in accordance with the desired kinematic viscosity. In general, the degree of polymerization of the second polyvinyl ether compound is so selected that the kinematic viscosity of the second polyvinyl ether compound at 40° C. is preferably from 5 to 1,000 mm$^2$/s, more preferably from 7 to 300 mm$^2$/s, even more preferably from 10 to 150 mm$^2$/s.

The second polyvinyl ether compound having the above-mentioned properties can be produced as mentioned below. Specifically, a vinyl ether monomer represented by the general formula (II-2) is polymerized, using a second polymerization initiator that is an alkylene glycol compound or a polyoxyalkylene glycol compound represented by the general formula (III), to give a polymer of the second polyvinyl ether compound. In polymerization, a compound having an alkylene glycol residue represented by "—O($R^b$O)mR$^a$" may be used along with the second polymerization initiator. The resultant polymer may be further hydrogenated.

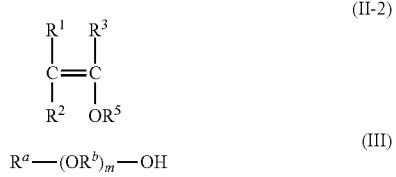

In the formula, $R^1$, $R^2$ and $R^3$ each represent a hydrogen atom or a hydrocarbon group having from 1 to 8 carbon atoms, and these may be the same or different. $R^5$ represents a hydrocarbon group having from 1 to 10 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^b$ represents a divalent hydrocarbon group having from 2 to 4 carbon atoms. m indicates a number of from 1 to 50 as an average value.

In the above formulas $R^a$, $R^b$, m and $R^1$ to $R^3$ and $R^5$ are as defined above.

On the other hand, the vinyl ether monomer represented by the general formula (II-2) includes, for example, vinyl ethers such as vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, etc.; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, etc.; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene, etc.

These vinyl ether monomers may be prepared by any conventional method.

The alkylene glycol compound represented by the general formula (III) has m of 1 in the general formula (III), and the polyoxyalkylene glycol represented by the general formula (III) has m of more than 1 in the general formula (III).

Specific examples of the alkylene glycol compound or the polyoxyalkylene glycol compound represented by the general formula (III) include, for example, alkylene glycols such as ethylene glycol, ethylene glycol monomethyl ether, diethylene glycol, diethylene glycol monomethyl ether, triethylene glycol, triethylene glycol monomethyl ether, propylene glycol, propylene glycol monomethyl ether, dipropylene glycol, dipropylene glycol monomethyl ether, tripropylene glycol, tripropylene glycol monomethyl ether, etc.; polyethylene glycol, polypropylene glycol, polyoxyalkylene glycol and their monoether compounds, etc.

Of the above, the alkylene glycol compound or the polyoxyalkylene glycol compound represented by the general formula (III) is preferably compounds having an ethylene glycol residue of the general formula (III) where $R^b$ is an ethylene group (for example, ethylene glycol, triethylene glycol, polyethylene glycol, etc.), and compounds having a propylene glycol residue of the general formula (III) where $R^b$ is a propylene group (for example, propylene glycol, tripropylene glycol, polypropylene glycol, etc.).

The compounds having an alkylene glycol residue include polyethylene glycol terminated with methoxy at one end, polypropylene glycol terminated with methoxy at one end, and their copolymers, etc. The compounds having an alkylene glycol residue are preferably compounds having an ethylene glycol residue or a propylene glycol residue.

One alone or two or more different types of alkylene glycol compounds or polyoxyalkylene glycol compounds represented by the general formula (III) may be used here either singly or as combined.

The second polyvinyl ether compound can be produced through radical polymerization, cationic polymerization, radiation polymerization or the like of the vinyl ether monomer represented by the general formula (II-2). For example, a polymer having a desired viscosity can be produced by polymerizing a vinyl ether monomer represented by the general formula (II-2) according to the method mentioned below. In initiating the polymerization, at least the second polymerization initiator being an alkylene glycol compound or a polyoxyalkylene glycol compound represented by the general formula (III) is used. For polymerization of the vinyl ether monomer represented by the general formula (II-2), further the following components may be used, if desired. For example, a combination of a Broensted acid, a Lewis acid or an organometallic compound with water, an alcohol, a phenol, an acetal or an addition product of a vinyl ether and a carboxylic acid can be used. As the Broensted acid, there may be mentioned, for example, hydrofluoric acid, hydrochloric acid, hydrobromic acid, hydroiodic acid, nitric acid, sulfuric acid, trichloroacetic acid, trifluoroacetic acid, etc. As the Lewis acid, there may be mentioned, for example, boron trifluoride, aluminum trichloride, aluminum tribromide, tin tetrachloride, zinc dichloride, ferric chloride, etc. Among these Lewis acids, boron trifluoride is particularly preferred. As the organometallic compound, there may be mentioned, for example, diethyl aluminum chloride, ethyl aluminum chloride, diethyl zinc, etc.

Any of water, an alcohol, a phenol, an acetal or an addition product of a vinyl ether and a carboxylic acid may be arbitrarily selected for combining with those mentioned above. Here, the alcohol includes, for example, saturated aliphatic alcohols having from 1 to 20 carbon atoms, such as methanol, ethanol, propanol, isopropanol, butanol, isobutanol, sec-butanol, tert-butanol, various pentanols, various hexanols, various heptanols, various octanols, etc.; unsaturated aliphatic alcohols having from 3 to 10 carbon atoms such as allyl alcohol, etc.

The polymerization of the vinyl ether monomer represented by the general formula (II-2) can be initiated at a temperature between −80 and 150° C., and can be generally carried out within a temperature range of from −80 to 50° C., although the temperatures vary with the kinds of the starting material and the initiator. The polymerization terminates in about 10 seconds to 10 hours after the start of the reaction. With regard to the control of the molecular weight in the polymerization, a polymer having a low average molecular weight can be obtained by increasing the amount of the water, alcohol, phenol, acetal or addition product of a vinyl ether and a carboxylic acid relative to the vinyl ether monomer represented by the general formula (II-2). Further, a polymer having a low average molecular weight can be obtained by increasing the amount of the above-described Broensted acid or Lewis acid. The polymerization is generally carried out in the presence of a solvent.

The solvent is not specifically limited as long as it can dissolve the necessary amount of the reaction starting materials and is inert to the reaction. For example, favorably used here are a hydrocarbon solvent such as hexane, benzene, toluene, etc., and an ether solvent such as ethyl ether, 1,2-dimethoxyethane, tetrahydrofuran, etc. The polymerization reaction may be terminated by addition of an alkali. After the termination of the polymerization, if desired, the reaction liquid is subjected to usual separation and/or purification treatments to give the intended second polyvinyl ether compound having a structure represented by the general formula (I-2).

The second polyvinyl ether compound is such that the carbon/oxygen molar ratio in all the side chains in the polymer (second polyvinyl ether compound) is from 1.00 to less than 2.40. The polymer having a molar ratio falling within the above-mentioned range can be produced by controlling the composition of the second polymerization initiator being an alkylene glycol compound or a polyoxyalkylene glycol compound represented by the general formula (III), which is used as a polymerization initiator.

Specifically, using the second polymerization initiator makes the second polyvinyl ether compound have a carbon/oxygen molar ratio of from 1.00 to less than 2.40. In the second aspect of the present invention, preferably, the amount of the compound having an ethylene glycol residue and/or a propylene glycol residue in the polymerization initiator is from 10 to 100% by mass or so relative to the total mass of the polymerization initiator.

The lubricating oil for a compression-type refrigerator of the first aspect of the present invention contains the first polyvinyl ether compound in a ratio of preferably 70% by mass or more, more preferably 80% by mass or more, even more preferably 90% by mass or more, especially preferably 100% by mass. Only one kind of the first polyvinyl ether compound may be used, and alternatively, two or more kinds thereof may be used in combination. Not specifically defined, any lube base oil other than polyvinyl ether compounds may be used in conjunction with the polyvinyl ether compound in a ratio of 30% by mass or less.

Similarly, the lubricating oil for compression-type refrigerators of the second aspect of the present invention contains the second polyvinyl ether compound in a ratio of preferably 70% by mass or more, more preferably 80% by mass or more, even more preferably 90% by mass or more, especially preferably 100% by mass. Only one kind of the second polyvinyl ether compound may be used, and alternatively, two or more kinds thereof may be used in combination. Not specifically defined, any lube base oil other than polyvinyl ether compounds may be used in conjunction with the polyvinyl ether compound in a ratio of 30% by mass or less.

If desired, various additives used in already-existing lubricating oils, for example, a load withstanding additive, a chlorine scavenger, an antioxidant, a metal deactivator, an antifoaming agent, a detergent dispersant, a viscosity index improver, an oily agent, an antiwear agent, an extreme pressure agent, a rust inhibitor, a corrosion inhibitor, a pour point depressant and the like may be added to the lubricating oil for compression-type refrigerators of the first aspect of the present invention and to the lubricating oil for compression-type refrigerators of the second aspect of the present invention, within the range not detracting from the object of the present invention.

Examples of the load withstanding additive include an organic sulfur compound-type additive such as monosulfides, polysulfides, sulfoxides, sulfones, thiosulfinates, sulfurized fats and oils, thiocarbonates, thiophenes, thiazoles, methanesulfonates; a phosphate-type additive such as monoesters of phosphoric acid, diesters of phosphoric acid, triesters of phosphoric acid (e.g., tricresyl phosphate), etc.; a phosphite-type additive such as monoesters of phosphorous acid, diesters of phosphorous acid, triesters of phosphorous acid, etc.; a thiophosphate-type additive such as triesters of thiophosphoric acid, etc.; a fatty acid ester-type additive such as higher fatty acids, hydroxyaryl fatty acids, esters of carboxylic acid-containing polyhydric alcohol and, acrylic acid esters, etc.; an organic chlorine-type additive such as chlorinated hydrocarbons, chlorinated carboxylic acid derivatives, etc.; an organic fluorine-type additive such as fluorinated aliphatic carboxylic acids, ethylene fluoride resins, fluoroalkyl polysiloxanes, fluorinated graphite, etc.; an alcohol-type additive such as higher alcohols, etc.; a metallic compound-type additive such as naphthenic acid salts (e.g., lead naphthenate), fatty acid salts (e.g., lead salts of fatty acids), thiophosphoric acid salts (zinc dialkyldithiophosphates), thiocarbamic acid salts, organic molybdenum compounds, organic tin compounds, organic germanium compounds, boric acid esters, etc.

The chlorine scavenger includes glycidyl ether group-containing compounds, epoxidated fatty acid monoesters, epoxidated oils and fats, epoxycycloalkyl group-containing compounds. The antioxidant includes phenols (2,6-di-tert-butyl-p-cresol), aromatic amines (α-naphthylamine), etc. The metal deactivator includes benzotriazole derivatives.

The antifoaming agent includes silicone oil (dimethylpolysiloxane), polymethacrylates, etc. The detergent dispersants include sulfonates, phenates, succinimides, etc. The viscosity index improver includes polymethacrylates, polyisobutylenes, ethylene-propylene copolymers, hydrogenated styrene-diene copolymers, etc.

The compounding amount of these additives is generally from about 0.001 to 10% by mass or so, based on the total weight of the lubricating oil.

(Production Method for Lubricating Oil for Compression-Type Refrigerators]

The production method for a lubricating oil for compression-type refrigerators, which is for producing the lubricating oil for compression-type refrigerators of the first aspect of the present invention, comprises polymerizing a vinyl ether monomer represented by the general formula (II-1) using one or more types of first polymerization initiators selected from methanol, dimethylacetal and ethylmethylacetal, thereby producing the lubricating oil for compression-type refrigerators.

Specifically, the first polyvinyl ether compound to be contained in the lubricating oil for compression-type refrigerators of the first aspect of the present invention is produced according to the above-mentioned method, and if desired, various additives are mixed in the polyvinyl ether compound to give the lubricating oil for compression-type refrigerators of the first aspect of the present invention.

The production method for a lubricating oil for compression-type refrigerators, which is for producing the lubricating oil for compression-type refrigerators of the second aspect of the present invention, comprises polymerizing a vinyl ether monomer represented by the general formula (II-2) using a second polymerization initiator that is an alkylene glycol compound or a polyoxyalkylene glycol compound represented by the general formula (III), thereby producing the lubricating oil for compression-type refrigerators.

Specifically, the second polyvinyl ether compound to be contained in the lubricating oil for compression-type refrigerators of the second aspect of the present invention is produced according to the above-mentioned method, and if desired, various additives are mixed in the polyvinyl ether compound to give the lubricating oil for compression-type refrigerators of the second aspect of the present invention. Details of the vinyl ether monomer represented by the general formula (II-2) and the alkylene glycol compound or the polyoxyalkylene glycol compound represented by the general formula (III) are as described above.

[Composition for Compression-Type Refrigerators]

The composition for compression-type refrigerators of the present invention contains the lubricating oil for compression-type refrigerators of the first aspect of the present invention or the lubricating oil for compression-type refrigerators of the second aspect of the present invention, and contains R32 refrigerant. The lubricating oil for compression-type refrigerators of the first aspect of the present invention and the lubricating oil for compression-type refrigerators of the second aspect of the present invention are used as an lubricant oil in a composition for compression-type refrigerators, since the first polyvinyl ether compound and the second polyvinyl ether compound therein each are excellent in miscibility with R32 refrigerant and are excellent in lubrication performance.

Regarding the mixing ratio, preferably, the ratio by mass of the first polyvinyl ether compound or the second polyvinyl ether compound to R32 refrigerant (polyvinyl ether compound/R32 refrigerant) falls within a range of from 1/99 to 99/1, more preferably within a range of from 5/95 to 60/40.

The other refrigerants may be used in combination with R32 refrigerant as the refrigerants to be in the composition for compression-type refrigerators of the present invention. As the other refrigerant, hydrofluorocarbons refrigerants are employable, including saturated fluorohydrocarbon refrigerants and double bond-having, unsaturated fluorinated hydrocarbon refrigerants.

Typical examples of the saturated fluorinated hydrocarbon include R125 (pentafluoroethane), R134a (1,1,1,2-tetrafluoroethane), R143a (1,1,1-trifluoroethane), etc. A mixed refrigerant composed of two or more of the above refrigerants may also be used. As the mixed refrigerant, there may be mentioned, for example, R404A (a mixture of R125, R143a and R134a), R407A, R407C, R407E (these are mixtures of R32, R125 and R134a), R410A (a mixture of R32 and R125), R507A (a mixture of R125 and R143a), etc. Typical examples of the unsaturated fluorinated hydrocarbon refrigerant include R1225ye (1,2,3,3,3-pentafluoropropene), R1234yf (2,3,3,3-tetrafluoropropene), R1234ze (1,3,3,3-tetrafluoropropene), R1234yz (1,2,3,3-tetrafluoropropene), etc. These unsaturated fluorinated hydrocarbon refrigerants may be used singly or as a mixture of two or more thereof and, further, may be used as a mixture with the above saturated fluorinated hydrocarbon refrigerants.

Further, as the above-mentioned other refrigerants, a fluorine-containing ether refrigerant, a fluorine-free ether refrigerant such as dimethyl ether and the like are also usable as a mixed refrigerant, in addition to hydrofluorocarbons.

[Compression-Type Refrigeration Apparatus]

The present invention also provides a compression-type refrigeration apparatus using the lubricating oil for compression-type refrigerators of the present invention.

The lubricating oil for compression-type refrigerators for use in the compression-type refrigeration apparatus of the present invention uses at least one selected from a group consisting of the lubricating oil for compression-type refrigerators of the first aspect of the present invention, the lubricating oil for compression-type refrigerators of the second aspect of the present invention, and the lubricating oil for compression-type refrigerators of the first aspect of the present invention and the lubricating oil for compression-type refrigerators of the second aspect of the present invention, which are produced according to the production method for a lubricating oil for compression-type refrigerators of the present invention.

The compression-type refrigerant circulation system that the compression-type refrigeration apparatus of the present invention includes, for example, a compression-type refrigerant circulation system comprising 1) a constitution including at least a compressor, a condenser, an expansion mechanism (an expansion valve, etc.) and an evaporator, or 2) a constitution indispensably comprising a compressor, a condenser, an expansion mechanism, a drier and an evaporator. The compression-type refrigeration apparatus of the present invention uses R32 refrigerant and, as a lubricating oil (refrigerator oil), the above-mentioned lubricating oil for compression-type refrigerators of the present invention, along with such a compression-type refrigerant circulation system.

Here, the drier is preferably filled with a drying agent composed of a zeolite having a pore diameter of 3.5 Å or less. The zeolite includes natural zeolite and synthetic zeolite.

When such a drying agent is used in the compression-type refrigeration apparatus of the present invention, moisture in the refrigeration cycle can be efficiently removed without absorbing the refrigerant. At the same time, formation of powder due to deterioration of the drying agent itself can be prevented. Therefore, there is no fear of clogging of the piping due to powder formation and abnormal wears of sliding parts of the compressor caused by entry of the powder thus formed, so that the refrigeration apparatus can be stably operated for a long period of time.

Further, the compression-type refrigeration apparatus of the present invention constitutes a circulating system as the cooling cycle of the above-mentioned compression-type refrigeration apparatus, and may be a closed-type compressor of an inside high-pressure type or an inside low-pressure type in which the compressor and a motor are covered with a single cover, an open-type compressor in which the driving section of the compressor is located outside, a semi-closed-type compressor or a canned motor-type compressor.

In any of the above-described types of compressors, it is preferred that the windings of the motor stator be comprised of a core wire (such as a magnet wire) covered with an enamel coating having a glass transition temperature of 130° C. or higher or of an enamel wire fixed with a varnish having a glass transition temperature of 50° C. or higher. The enamel coating is preferably composed of a single layer or a composite layer made of polyesterimide, polyimide, polyamide, polyamideimide, etc. In particular, an enamel coating composed of a laminate having a lower layer having a lower glass transition temperature and an upper layer having a higher glass transition temperature has excellent water resistance, softening resistance and swelling resistance, shows high mechanical strength, rigidity and insulation property and, therefore, has a practically high utilization value.

In the compression-type refrigeration apparatus of the present invention, an insulation film used as an electrically insulating material for a motor section is preferably a crystalline plastic film having a glass transition temperature of 60° C. or higher. A crystalline plastic film having an oligomer content of 5% by mass or less is particularly preferred.

As the preferred crystalline plastic film having a glass transition temperature of 60° C. or higher, for example, there may be mentioned films of polyether nitrile, polyethylene terephthalate, polybutylene terephthalate, polyphenylene sulfide, polyether ether ketone, polyethylene naphthalate, polyamideimide or polyimide.

The insulation film of the motor may be made of a single layer of the above crystalline plastic film or may be made of a composite film in which a film having a lower glass transition temperature is covered with a layer of a plastic having a higher glass transition temperature.

In the compression-type refrigeration apparatus of the present invention, a vibration damping rubber may be disposed inside the compressor. In this case, such a vibration damping rubber may be suitably selected from an acrylonitrile-butadiene rubber (NBR), an ethylene-propylene-diene rubber (EPDM), an ethylene-propylene rubber (EPM), a hydrogenated acrylonitrile-butadiene rubber (HNBR), a silicone rubber and a fluorine-containing rubber (FKM). Particularly preferred is a rubber having a rubber expansion rate of 10% by mass or less.

Further, in the compression-type refrigeration apparatus of the present invention, various organic materials (such as sheath materials for lead wires, binding yarns, enameled wires, insulating films) may be disposed inside the compressor. In such a case, as the organic material, those having a reduction rate in tensile strength of 20% or less can be preferably used.

Further, in the compression-type refrigeration apparatus of the present invention, a gasket disposed within the compressor preferably has an expansion rate of 20% or less.

Specific examples of the compression-type refrigeration apparatus of the present invention include a closed-type scroll compressor, a closed-type swing compressor, a closed-type reciprocating compressor, a closed-type rotary compressor, etc. Closed-type compressors may be used for electric car air conditioners, air conditioners, refrigerators, water heaters, etc.

The lubricating oil for compression-type refrigerators of the first aspect of the present invention, the production method for the lubricating oil for compression-type refrigerator, the composition for compression-type refrigerators and the compression-type refrigeration apparatus may be constituted as follows:

(1-1) A lubricating oil for compression-type refrigerators using a difluoromethane (R32) refrigerant;

the lubricating oil for compression-type refrigerators containing a first polyvinyl ether compound that is a polymer having a structural unit represented by a general formula (I-1) and has a carbon/oxygen molar ratio of from 3.0 to less than 4.0.

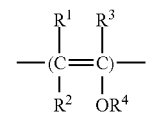

(I-1)

In the formula, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms. $R^1$ to $R^4$ may be the same or different in each structural unit.

(1-2) The lubricating oil for compression-type refrigerators according to (1-1), wherein the first polyvinyl ether compound contains a methoxy group in a ratio of 1 mol % or more relative to all the side chains in the polymer.

(1-3) A production method for a lubricating oil for compression-type refrigerators, which is for producing the lubricating oil for compression-type refrigerators described in (1-1) or (1-2), which comprises polymerizing a vinyl ether monomer represented by a general formula (II-1) using one or more types of first polymerization initiators selected from methanol, dimethylacetal and ethylmethylacetal.

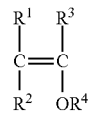

(II-1)

In the formula, $R^1$, $R^2$ and $R^3$ each represent a hydrogen atom or a hydrocarbon group having from 1 to 8 carbon atoms, and these may be the same or different. $R^4$ represents a hydrocarbon group having from 1 to 20 carbon atoms.

(1-4) A composition for compression-type refrigerators containing the lubricating oil for compression-type refrigerators described in (1-1) or (1-2) and R32 refrigerant.

(1-5) A composition for compression-type refrigerators containing the lubricating oil for compression-type refrigerators obtained according to the production method described in (1-3) and R32 refrigerant.

(1-6) A compression-type refrigeration apparatus using the lubricating oil for compression-type refrigerators described in (1-1) or (1-2) and/or the lubricating oil for compression-type refrigerators obtained according to the production method described in (1-3).

The lubricating oil for compression-type refrigerators of the first aspect of the present invention has the above-mentioned constitution, and the present invention thus provides a lubricating oil for compression-type refrigerators not separating from R32 refrigerant even at a temperature lower than −20° C. and a production method for it, as well as a composition for compression-type refrigerators using the lubricating oil for compression-type refrigerators, etc. As a result, the present invention makes it possible to use R32 refrigerant having a low global warming coefficient and contributes toward prevention of global warming.

The lubricating oil for compression-type refrigerators of the first aspect of the present invention has been invented on the basis of the finding that a lubricating oil containing the first polyvinyl ether compound that has a specific structural unit and has a carbon/oxygen molar ratio of from 3.0 to less than 4.0 satisfies the intended object.

The production method for the lubricating oil for compression-type refrigerators of the first aspect of the present invention has been invented on the basis of the finding that the first polyvinyl ether compound to be contained in the lubricating oil for compression-type refrigerators can be readily produced using a specific polymerization initiator and a specific monomer.

The lubricating oil for compression-type refrigerators of the second aspect of the present invention, the production method for the lubricating oil for compression-type refrigerator, the composition for compression-type refrigerators and the compression-type refrigeration apparatus may be constituted as follows:

(2-1) A lubricating oil for compression-type refrigerators using a difluoromethane (R32) refrigerant;
the lubricating oil for compression-type refrigerators containing a second polyvinyl ether compound that is a polymer having an alkylene glycol unit or a polyoxyalkylene glycol unit and a vinyl ether unit in the molecule and having a molecular weight falling within a range of from 300 to 3,000, in which the carbon/oxygen molar ratio in all the side chains in the polymer is from 1.00 to less than 2.40.

(2-2) The lubricating oil for compression-type refrigerators according to (2-1), wherein the second polyvinyl ether compound has a structure represented by a general formula (I-2).

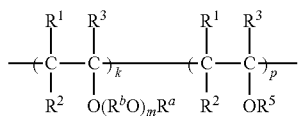
(I-2)

In the formula, $R^1$, $R^2$ and $R^3$ each represent a hydrogen atom or a hydrocarbon group having from 1 to 8 carbon atoms, and these may be the same or different. $R^b$ represents a divalent hydrocarbon group having from 2 to 4 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^5$ represents a hydrocarbon group having from 1 to 10 carbon atoms. In case where the formula has plural $R^a$'s, $R^b$'s and $R^5$'s, they may be individually the same or different.

m indicates from 1 to 50 as an average value, k indicates from 1 to 50, p indicates from 0 to 50, and when k and p are plural numbers, they may indicate block units or random units. When the formula has plural $R^bO$'s, those plural $R^bO$'s may be the same or different.

(2-3) The lubricating oil for compression-type refrigerators according to (2-1) or (2-2), wherein the second polyvinyl ether compound contains an ethylene glycol residue and/or a propylene glycol residue in the polymer.

(2-4) The lubricating oil for compression-type refrigerators according to (2-3), wherein the second polyvinyl ether compound contains an ethylene glycol residue and/or a propylene glycol residue in a ratio of from 5% by mass to 50% by mass relative to the total mass thereof.

(2-5) A production method for a lubricating oil for compression-type refrigerators, comprising polymerizing a vinyl ether monomer represented by a general formula (II-2) using a second polymerization initiator that is an alkylene glycol compound or a polyoxyalkylene glycol compound represented by a general formula (III), thereby producing the lubricating oil for compression-type refrigerators of any of (2-1) to (2-4).

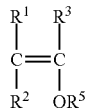
(II-2)

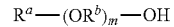
(III)

In the formula, $R^1$, $R^2$ and $R^3$ each represent a hydrogen atom or a hydrocarbon group having from 1 to 8 carbon atoms, and these may be the same or different. $R^5$ represents a hydrocarbon group having from 1 to 10 carbon atoms. $R^a$ represents a hydrogen atom, an aliphatic or alicyclic hydrocarbon group having from 1 to 20 carbon atoms, an aromatic group having from 1 to 20 carbon atoms and optionally having a substituent, an acyl group having from 2 to 20 carbon atoms, or an oxygen-containing hydrocarbon group having from 2 to 50 carbon atoms. $R^b$ represents a divalent hydrocarbon group having from 2 to 4 carbon atoms. m indicates a number of from 1 to 50 as an average value.

(2-6) A composition for compression-type refrigerators containing the lubricating oil for compression-type refrigerators described in any of (2-1) to (2-4), and R32 refrigerant.

(2-7) A composition for compression-type refrigerators containing the lubricating oil for compression-type refrigerators obtained according to the production method described in (2-5), and R32 refrigerant.

(2-8) A compression-type refrigeration apparatus using the lubricating oil for compression-type refrigerators described in any of (2-1) to (2-4), and/or the lubricating oil for compression-type refrigerators obtained according to the production method described in (2-5).

The lubricating oil for compression-type refrigerators of the second aspect of the present invention has the above-mentioned constitution, and the present invention thus provides a lubricating oil for compression-type refrigerators not separating from R32 refrigerant even at a temperature lower than −20° C. and having a high viscosity index, and a production method for it, as well as a composition for compression-type refrigerators using the lubricating oil for compression-type refrigerators, etc. As a result, the present invention makes it possible to use R32 refrigerant having a low global warming coefficient and contributes toward prevention of global warming and toward enhancement of energy efficiency in refrigerators.

The lubricating oil for compression-type refrigerators of the second aspect of the present invention has been invented on the basis of the finding that a lubricating oil containing the second polyvinyl ether compound that is a polymer having specific structural units, in which the carbon/oxygen molar ratio in all the side chains in the polymer is from 1.00 to less than 2.40, satisfies the intended object.

The production method for the lubricating oil for compression-type refrigerators of the second aspect of the present invention has been invented on the basis of the finding that the second polyvinyl ether compound to be contained in the lubricating oil for compression-type refrigerators can be readily produced using a specific polymerization initiator and a specific monomer.

EXAMPLES

The present invention will be next described in more detail by way of examples but is not restricted to these examples in any way. Examples and Comparative Example with respect to the first aspect of the present invention are Example 1-1 to Example 1-3, and Comparative Example 1-1; and Examples and Comparative Examples with respect to the second aspect of the present invention are Example 2-1 to Example 2-4, and Comparative Example 2-1 and Comparative Example 2-2.

With respect to the base oil (polyvinyl ether compound) obtained in each example, the kinematic viscosity (40° C., 100° C.), the viscosity index (VI), the elementary analysis, the methoxy residue content ratio and the polypropylene group content ratio were measured as described below, and the miscibility test for the base oil obtained in each example with R32 is as described below.
(1) Kinematic Viscosity The kinematic viscosity at 100° C. and the kinematic viscosity at 40° C. were measured in accordance with JIS K2283 with respect to each oil to be measured.
(2) Viscosity Index (VI)

The viscosity index was determined from the above obtained kinematic viscosity in accordance with JIS K2283.
(3) Elementary Analysis The polyvinyl ether compound produced in each example was subjected to elementary analysis using Perkin Elmer's "2400-CHN" to determine the carbon/oxygen molar ratio (C/O molar ratio) thereof.

In Examples 1-1 to 1-3 and Comparative Example 1-1 relating to the first aspect of the present invention, the carbon/oxygen molar ratio of the polyvinyl ether compound was determined, and in Examples 2-1 to 2-4 and Comparative Examples 2-1 and 2-2 relating to the second aspect of the present invention, the carbon/oxygen molar ratio in all the side chains in the polyvinyl ether compound was determined.
(4) Measurement of Specific Group Content in Polyvinyl Ether Compound Produced in Each Example In Examples 1-1 to 1-3 and Comparative Example 1-1, the methoxy group content in all the side chains in the polyvinyl ether compound produced in each example was determined.

In Examples 2-1 to 2-4 and Comparative Examples 2-1 and 2-2, the content of propylene glycol residue, the ethylene glycol residue or the ethoxy group in the polyvinyl ether compound, relative to the total mass of the polyvinyl ether compound, was determined.

For determining the specific group content, the polyvinyl ether compound produced in each example was analyzed with JEOL's AL400 Model NMR to measure the NMR spectrum thereof, and based on the spectral data, the content was calculated.
(5) Measurement of Two-Layer Separation Temperature A sample of the polyvinyl ether compound produced in each example was analyzed for the miscibility with R32 (difluoromethane) refrigerant. Concretely, the method is as follows:

A predetermined amount of the sample, metered to be 10% by mass or 20% by mass relative to R32, was put in a pressure-resistant glass ampule, and this was connected to a vacuum pipe and an R32 gas pipe. The ampule was vacuum-degasified at room temperature, then cooled with liquid nitrogen, and a predetermined amount of R32 was introduced thereinto. Next, the ampule was sealed up, and gradually cooled from room temperature in a thermostat tank to measure the low-temperature separation temperature at which phase separation starts. Samples having a lower phase-separation temperature are better.

Preparation Example 1

Preparation of Catalyst

In a SUS316L autoclave having a volume of 2 L, 6 g of a nickel diatomaceous earth catalyst (trade name N113 manufactured by JGC Catalysts and Chemicals Ltd.) and 300 g of isooctane were placed. The atmosphere in the autoclave was substituted with nitrogen and then with hydrogen. Then, the hydrogen pressure was adjusted to 3.0 MPaG and the temperature was raised. The autoclave was maintained at 140° C. for 30 minutes and thereafter cooled to room temperature. After the atmosphere in the autoclave was substituted with nitrogen, 10 g of acetaldehyde diethyl acetal were added to the autoclave. The atmosphere in the autoclave was again substituted with nitrogen and then with hydrogen. The hydrogen pressure was adjusted to 3.0 MPaG and the temperature was raised. The autoclave was maintained at 130° C. for 30 minutes and thereafter cooled to room temperature. As a result of the temperature rise, the pressure within the autoclave increased. However, as a result of the reaction of the acetaldehyde diethyl acetal, the hydrogen pressure was found to decrease. When the hydrogen pressure decreased to below 3.0 MPaG, hydrogen was supplied to maintain the hydrogen pressure therewithin at 3.0 MPaG. The autoclave was then cooled to room temperature and the pressure was released. The atmosphere in the autoclave was then substituted with nitrogen. Thereafter the pressure in the autoclave was released.

Example 1-1

In a 300-cm³ glass flask equipped with a stirrer, 40 g of toluene, 8.33 g of methanol and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm³/min, and at the time when the ether was supplied in an amount of 22.5 g, the pump was once stopped. Temperature increase inside the flask owing to the reaction was confirmed, and then the pump was re-started, and the remaining ethyl vinyl ether was supplied taking 4 hours. During this, the temperature inside the flask was controlled with a water bath to be 25° C. After the supply, this was further stirred for 5 minutes. The reaction mixture was transferred to a washing tank, and washed once with 200 ml of an aqueous 1 mass % sodium hydroxide solution, and further washed three times with 200 ml of pure water. Using a rotary evaporator, the solvent and the unreacted materials were removed under reduced pressure to give 150 g of a crude product.

120 g of the above crude product and 300 g of isooctane were put into the 2-liter SUS-316L-made autoclave with the catalyst prepared in Preparation Example 1 kept put therein. The autoclave was purged with hydrogen, then with the hydrogen pressure therein kept at 3.5 MPa, this was heated up to 140° C. taking 30 minutes while stirring, and further reacted at 140° C. for 3 hours. After the reaction, this was cooled to room temperature and depressurized to normal pressure. Using filter paper, this was filtered. Using a rotary evaporator, the solvent and moisture and the like were removed under reduced pressure.

The yield of the base oil was 108 g. The C/O molar ratio was 3.9, and the methoxy group content was 10 mol %.

The obtained base oil was a polymer having a structural unit represented by the general formula (I-1), and was a polyvinyl ether compound of the general formula (I-1) where $R^1$ to $R^3$ are hydrogen atoms and $R^4$ is an ethyl group.

Example 1-2

In a 300-cm³ glass flask equipped with a stirrer, 36 g of isooctane, 8.53 g of methanol and 0.1 g of boron trifluoride diethyl ether complex were put. 135 g of ethyl vinyl ether and 15 g of methyl vinyl ether were put into a pressure container, and sealed up. With stirring inside the flask, a mixture of ethyl vinyl ether and methyl vinyl ether was supplied thereinto via a pump at 5 cm³/min, and at the time when the mixture was supplied in an amount of 22 g, the pump was once stopped. Temperature increase inside the flask owing to the reaction was confirmed, and then the pump was restarted, and the remaining vinyl ether mixture was supplied taking 4 hours. During this, the temperature was so controlled with a water bath that the temperature inside the flask could be 25° C. After the supply, this was further stirred for 5 minutes. Next, this was washed and hydrogenated in the same manner as in Example 1-1 to give 110 g of a base oil.

The C/O molar ratio in the base oil was 3.8, and the methoxy group content was 20 mol %.

The obtained base oil was a mixture of a polymer having a structural unit represented by the general formula (I-1), which is a polyvinyl ether compound of the general formula (I-1) where $R^1$ to $R^3$ are hydrogen atoms and $R^4$ is a methyl group, and a polymer having a structural unit represented by the general formula (I-1), which is a polyvinyl ether compound of the general formula (I-1) where $R^1$ to $R^3$ are hydrogen atoms and $R^4$ is an ethyl group.

Example 1-3

In a 300-cm³ glass flask equipped with a stirrer, 38 g of toluene, 20.3 g of dimethyl acetal and 0.1 g of boron trifluoride diethyl ether complex were put. 130 g of ethyl vinyl ether was put in an Erlenmeyer flask. With stirring inside the flask, ethyl vinyl ether was supplied via a pump taking 4 hours. During this, the temperature was so controlled with a water bath that the temperature inside the flask could be 25° C. After the supply, this was further stirred for 5 minutes. Next, this was washed and hydrogenated in the same manner as in Example 1-1 to give 100 g of a base oil.

The C/O molar ratio in the base oil was 3.8, and the methoxy group content was 20 mol %.

The obtained base oil was a polymer having a structural unit represented by the general formula (I-1), and was a polyvinyl ether compound of the general formula (I-1) where $R^1$ to $R^3$ are hydrogen atoms and $R^4$ is an ethyl group.

Comparative Example 1-1

In a 300-cm³ glass flask equipped with a stirrer, 24 g of isooctane, 7.67 g of ethanol and 0.1 g of boron trifluoride diethyl ether complex were put. 90 g of ethyl vinyl ether was put in an Erlenmeyer flask. With stirring inside the flask, ethyl vinyl ether was supplied thereinto via a pump at 5 cm³/min, and at the time when the ether was supplied in an amount of 14 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 1-1 to give 75 g of a product.

The C/O molar ratio of the above product was 4.0, and the methoxy group content was 0 mol %.

The obtained base oil was a polyvinyl ether compound of the general formula (I-1) where $R^1$ to $R^3$ are hydrogen atoms and $R^4$ is an ethyl group.

Properties of the base oils obtained in the above Examples 1-1 to 1-3 and Comparative Example 1-1 are shown in Table 1.

TABLE 1

| | Outline | Kinematic Viscosity (mm²/s) | | | Two-Layer Separation Temperature (° C.) | C/O |
| --- | --- | --- | --- | --- | --- | --- |
| | | 40° C. | 100° C. | VI | low-temperature side | Molar Ratio |
| Example 1-1 | Initiator: with methanol | 34.0 | 5.4 | 91.7 | −24.1 | 3.9 |
| Example 1-2 | Initiator: with methanol, copolymerization | 27.8 | 4.7 | 81.4 | −37.7 | 3.8 |
| Example 1-3 | Initiator: with dimethyl acetal | 30.0 | 5.0 | 88.0 | −35.0 | 3.8 |
| Comparative Example 1-1 | Initiator: without methanol | 33.3 | 5.3 | 90.3 | −17.1 | 4.0 |

As known from Table 1, in Comparative Example 1-1 where the C/O molar ratio was 4.0, the two-layer separation temperature was −17.1° C. on the low-temperature side and was high as compared with that in Examples 1-1 to 1-3, and a desired low-temperature miscibility could not be attained.

Example 2-1

In a 300-cm³ glass flask equipped with a stirrer, 43 g of toluene, 19.8 g of ethylene glycol monomethyl ether and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm³/min, and at the time when the ether was supplied in an amount of 22 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. The reaction mixture was transferred to a washing tank, and washed once with 200 ml of an aqueous 1 mass % sodium hydroxide solution, and further washed three times with 200 ml of pure water. Using a rotary evaporator, the solvent and the unreacted materials were removed under reduced pressure to give 150 g of a crude product.

120 g of the crude product and 300 g of isooctane were put into the 2-liter SUS-316L-made autoclave with the catalyst prepared in Preparation Example 2-1 kept put therein. The autoclave was purged with hydrogen, then with the hydrogen pressure therein kept at 3.5 MPa, this was heated up to 140° C. taking 30 minutes while stirring, and further reacted at 140° C. for 3 hours. After the reaction, this was cooled to room temperature and depressurized to normal pressure. Using filter paper, this was filtered. Using a rotary evaporator, the solvent and moisture and the like were removed under reduced pressure. The yield of the base oil was 108 g. The C/O molar ratio in all the side chains in the polymer was 1.89, and the estimated value of the molecular weight of the polymer, as based on the theoretical structural formula of the base oil estimated from the charge-in quantity of the source materials, was 564. The ethylene glycol residue content in the base oil was 13.3% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is an ethylene group and m is 1, and where $R^1$ to $R^3$ in the vinyl ether unit are hydrogen atoms and $R^5$ is an ethyl group.

Example 2-2

In a 300-cm³ glass flask equipped with a stirrer, 48 g of toluene, 42.7 g of triethylene glycol monomethyl ether and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm³/min, and at the time when the ether was supplied in an amount of 22 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 2-1 to give 150 g of a base oil.

The C/O molar ratio in all the side chains in the polymer of the base oil was 1.91, and the estimated value of the molecular weight of the polymer, as based on the theoretical structural formula of the base oil estimated from the charge-in quantity of the source materials, was 696. The triethylene glycol residue content in the base oil was 23.4% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is an ethylene group and m is 3, and where $R^1$ to $R^3$ in the vinyl ether unit are hydrogen atoms and $R^5$ is an ethyl group.

Example 2-3

In a 300-cm³ glass flask equipped with a stirrer, 37 g of toluene, 46.2 g of polyethylene glycol (PEG200) and 0.2 g of boron trifluoride diethyl ether complex were put. 100 g of ethyl vinyl ether was put in an Erlenmeyer flask. With stirring inside the flask, ethyl vinyl ether was supplied thereinto via a pump at 5 cm³/min, and at the time when the ether was supplied in an amount of 40 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 2-1 to give 70 g of a base oil.

The C/O molar ratio in all the side chains in the polymer of the base oil was 2.18, and the estimated value of the molecular weight of the polymer, as based on the theoretical structural formula of the base oil estimated from the charge-in quantity of the source materials, was 796. The polyethylene glycol residue content in the base oil was 25.8% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is an ethylene group and m is 4, and where $R^1$ to $R^3$ in the vinyl ether unit are hydrogen atoms and $R^5$ is an ethyl group.

Example 2-4

In a 300-cm³ glass flask equipped with a stirrer, 54 g of isooctane, 65.2 g of polypropylene glycol monomethyl ether (mean polymerization number: 3) and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm³/min, and at the time when the ether was supplied in an amount of 40 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 2-1 to give 150 g of a base oil.

The C/O molar ratio in all the side chains in the polymer of the base oil was 2.20, and the estimated value of the molecular weight of the polymer, as based on the theoretical structural formula of the base oil estimated from the charge-in quantity of the source materials, was 594. The polypropylene glycol residue content in the base oil was 34.5% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is a propylene group and m is 3, and where $R^1$ to $R^3$ in the vinyl ether unit are hydrogen atoms and $R^5$ is an ethyl group.

Comparative Example 2-1

In a 300-cm$^3$ glass flask equipped with a stirrer, 74 g of isooctane, 146 g of polypropylene glycol monomethyl ether (mean polymerization number: 7) and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm$^3$/min, and at the time when the ether was supplied in an amount of 40 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 2-1 to give 160 g of a base oil.

The C/O molar ratio in all the side chains in the polymer of the base oil was 2.46, and the estimated value of the molecular weight of the polymer, as based on the theoretical structural formula of the base oil estimated from the charge-in quantity of the source materials, was 826. The polypropylene glycol residue content in the base oil was 52.9% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is a propylene group and m is 7, and where $R^1$ to $R^3$ in the vinyl ether unit are hydrogen atoms and $R^5$ is an ethyl group.

Comparative Example 2-2

In a 300-cm$^3$ glass flask equipped with a stirrer, 62 g of isooctane, 97.5 g of polypropylene glycol monomethyl ether (mean polymerization number: 7) and 0.1 g of boron trifluoride diethyl ether complex were put. 150 g of ethyl vinyl ether was put in an Erlenmeyer flask. With stirring inside the flask, ethyl vinyl ether was supplied thereinto via a pump at 5 cm$^3$/min, and at the time when the ether was supplied in an amount of 27 g, the pump was once stopped. Temperature increase inside the flask owing to the reaction was confirmed, and then the pump was re-started, and the remaining vinyl ether was supplied taking 4 hours. During this, the temperature was so controlled with a water bath that the temperature inside the flask could be 25° C. After the supply, this was further stirred for 5 minutes. Next, this was washed and hydrogenated in the same manner as in Example 2-1 to give 180 g of a base oil.

The C/O molar ratio in all the side chains in the polymer of the base oil was 2.43, and the estimated value of the molecular weight of the polymer, as based on the theoretical structural formula of the base oil estimated from the charge-in quantity of the source materials, was 1041. The polypropylene glycol residue content in the base oil was 42.0% by mass.

The obtained base oil was a polymer having a structure represented by the general formula (I-2), which is a polyvinyl ether compound of the general formula (I-2) where $R^1$ to $R^3$ in the alkylene glycol unit are hydrogen atoms, $R^a$ is a methyl group, $R^b$ is a propylene group and m is 7, and where $R^1$ to $R^3$ in the vinyl ether unit are hydrogen atoms and $R^5$ is an ethyl group.

Properties of the base oils obtained in the above Examples 2-1 to 2-4 and Comparative Examples 2-1 and 2-2 are shown in Table 2.

TABLE 2

| Number | Kinematic Viscosity (mm$^2$/s) | | | Two-Layer Separation Temperature (° C.) low-temperature side | C/O Molar Ratio | Molecular Weight Calculated Value | Content of Specific Group in Polymer (mass %) |
|---|---|---|---|---|---|---|---|
| | 40° C. | 100° C. | VI | | | | |
| Example 2-1 | 21.5 | 4.2 | 97.9 | −33.6 | 1.89 | 564 | 13.3 |
| Example 2-2 | 18.7 | 4.1 | 123.2 | <−50 | 1.91 | 696 | 23.4 |
| Example 2-3 | 17.1 | 4.2 | 157.8 | −28.7 | 2.18 | 796 | 25.8 |
| Example 2-4 | 29.2 | 5.4 | 124.0 | −30.1 | 2.20 | 594 | 34.5 |
| Comparative Example 2-1 | 38.2 | 7.3 | 161.0 | (separated) | 2.46 | 826 | 52.9 |
| Comparative Example 2-2 | 67.8 | 10.5 | 142.8 | (separated) | 2.43 | 1042 | 42.0 |

As known from Table 2, in Comparative Examples in which the C/O molar ratio in all the side chains in the polymer was not less than 2.40, the two-layer separation temperature was high on the low-temperature side as compared with that in Examples 2-1 to 2-4, and a desired low-temperature miscibility could not be attained.

INDUSTRIAL APPLICABILITY

The lubricating oil for compression-type refrigerators of the first and second aspects of the present invention can use R32 refrigerant having a low global warming coefficient, and therefore contributes toward prevention of global warming. Further, the lubricating oil for compression-type refrigerators of the second aspect of the present, invention has a low viscosity and a high viscosity index, and therefore improves the energy efficiency in refrigerators.

The invention claimed is:

1. A composition, comprising:
   R32 refrigerant; and
   a base oil including a first polyvinyl ether compound that is a polymer comprising a structural unit represented by formula (I-1) and wherein the first polyvinyl ether compound has a carbon/oxygen molar ratio of from 3.0 to less than 4.0:

where
- $R^1$, $R^2$ and $R^3$ each independently represent a hydrogen atom or a hydrocarbon group comprising from 1 to 8 carbon atoms;
- $R^4$ represents a hydrocarbon group comprising from 1 to 20 carbon atoms; and
- $R^4$ is optionally the same as $R^1$ in each structural unit, wherein the first polyvinyl ether compound contains methoxy groups in a ratio of 10 mol % or more relative to all the side chains in the first polyvinyl ether compound.

2. The composition according to claim 1, which is suitable for compression-type refrigerators using a difluoromethane (R32) refrigerant.

3. The composition according to claim 1, wherein the first polyvinyl ether compound contains methoxy groups in a ratio of 20 mol % or more relative to all the side chains in the first polyvinyl ether compound.

4. The composition according to claim 1, wherein the first polyvinyl ether compound that is a polymer comprising a structural unit represented by formula (I-1) and has a carbon/oxygen molar ratio of from 3.5 to less than 4.0.

5. The composition according to claim 1, wherein the first polyvinyl ether compound that is a polymer comprising a structural unit represented by formula (I-1) and has a carbon/oxygen molar ratio of from 3.7 to 3.9.

6. The composition according to claim 1, wherein the first polyvinyl ether compound is a polymer consisting of the structural unit represented by formula (I-1).

7. The composition according to claim 1, which consists of the first polyvinyl ether compound and the R32 refrigerant.

8. The composition according to claim 1, wherein the base oil consists of the first polyvinyl ether compound and wherein the first polyvinyl ether compound consists of methyl vinyl ether and ethyl vinyl ether.

9. The composition according to claim 1, consisting of the R32 refrigerant, polymethyl vinyl ether and polyethyl vinyl ether.

10. The composition according to claim 1, having a two-layer separation temperature of −24.1 to −35° C.

11. A compression-type refrigeration apparatus, comprising: the composition according to claim 1.

* * * * *